US007716671B2

(12) United States Patent
Lee et al.

(10) Patent No.: US 7,716,671 B2
(45) Date of Patent: May 11, 2010

(54) METHOD FOR COORDINATING A SET OF RELATED TASKS AND EVENTS BY REDUCING DUPLICATED EFFORT

(75) Inventors: Johnny Lee, San Gabriel, CA (US); Labhesh Patel, San Francisco, CA (US); David Lee, Sunnyvale, CA (US); Fadi Jabbour, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 320 days.

(21) Appl. No.: 11/177,519

(22) Filed: Jul. 7, 2005

(65) Prior Publication Data
US 2007/0011678 A1 Jan. 11, 2007

(51) Int. Cl.
*G06F 9/46* (2006.01)
*G06F 15/16* (2006.01)
*G06Q 10/00* (2006.01)
*G01C 21/34* (2006.01)

(52) U.S. Cl. .................... 718/106; 705/5; 705/6; 705/8; 709/204; 709/248

(58) Field of Classification Search ......... 718/100–108; 709/201–206, 248; 705/1, 7–9, 5–6; 704/275
See application file for complete search history.

(56) References Cited

U.S. PATENT DOCUMENTS

| 4,788,715 | A |   | 11/1988 | Lee |          |
|-----------|---|---|---------|-----|----------|
| 5,214,688 | A |   | 5/1993  | Szlam et al. |  |
| 5,530,861 | A |   | 6/1996  | Diamant et al. | |
| 5,729,600 | A |   | 3/1998  | Blaha et al. | |
| 5,745,687 | A | * | 4/1998  | Randell | 709/201 |
| 5,768,506 | A | * | 6/1998  | Randell | 709/202 |
| 5,826,020 | A | * | 10/1998 | Randell | 709/202 |
| 5,974,392 | A |   | 10/1999 | Endo |        |
| 5,987,118 | A |   | 11/1999 | Dickerman et al. | |
| 6,016,478 | A | * | 1/2000  | Zhang et al. | 705/9 |
| 6,088,443 | A |   | 7/2000  | Darland et al. | |
| 6,101,481 | A | * | 8/2000  | Miller | 705/9 |

(Continued)

OTHER PUBLICATIONS

Kreifelts et al., "Sharing To-Do Lists With a Distributed Task Manager", ECSCW, 1993, pp. 1-16.*

(Continued)

*Primary Examiner*—Meng-Ai An
*Assistant Examiner*—Jennifer N To
(74) *Attorney, Agent, or Firm*—Stolowitz Ford Cowger LLP

(57) ABSTRACT

A template listing one or more associated tasks is distributed to one or more devices, each device having a respective user. A task is selectively designated as either shared or individual. When information indicating that an action associated with a particular task has been performed is received at a first one of the devices, the template is updated at the first device, and optionally at others of the devices to indicate to others of the users that the action has been performed. The associated action of a shared task is performed once for all users, and the associated action of an individual task is performed separately by one or more of the users. Task information is optionally communicated between a template on a particular one of the devices and a personal information manager of the respective user of a particular device.

20 Claims, 3 Drawing Sheets

U.S. PATENT DOCUMENTS

| | | | |
|---|---|---|---|
| 6,111,947 A | 8/2000 | Galgano, Jr. et al. | |
| 6,188,761 B1 | 2/2001 | Dickerman et al. | |
| 6,263,065 B1 | 7/2001 | Durinovic-Johri et al. | |
| 6,496,580 B1 | 12/2002 | Chack | |
| 6,546,087 B2 | 4/2003 | Shaffer et al. | |
| 6,564,245 B1* | 5/2003 | Fukasawa et al. | 709/205 |
| 6,678,714 B1* | 1/2004 | Olapurath et al. | 718/104 |
| 6,721,948 B1* | 4/2004 | Morgan | 718/102 |
| 6,850,615 B1 | 2/2005 | Patel et al. | |
| 6,870,913 B2* | 3/2005 | Narasimhan et al. | 379/106.02 |
| 6,954,737 B2* | 10/2005 | Kalantar et al. | 705/50 |
| 7,027,997 B1* | 4/2006 | Robinson et al. | 705/9 |
| 7,050,569 B1* | 5/2006 | Weaver et al. | 379/266.01 |
| 2001/0047264 A1* | 11/2001 | Roundtree | 704/275 |
| 2002/0007348 A1* | 1/2002 | Ali et al. | 705/51 |
| 2002/0165894 A1 | 11/2002 | Kashani | |
| 2003/0028594 A1 | 2/2003 | Laschkewitsch et al. | |
| 2003/0050955 A1 | 3/2003 | Eatough et al. | |
| 2004/0167652 A1 | 8/2004 | Ishii | |
| 2004/0243458 A1* | 12/2004 | Barkan | 705/9 |
| 2006/0069599 A1* | 3/2006 | Hatoun et al. | 705/8 |
| 2006/0143034 A1* | 6/2006 | Rothermel et al. | 705/1 |
| 2006/0167737 A1* | 7/2006 | Muller et al. | 705/9 |
| 2007/0168215 A1* | 7/2007 | Tang | 705/1 |
| 2007/0198977 A1* | 8/2007 | Abernethy et al. | 718/100 |
| 2007/0282658 A1* | 12/2007 | Brintle | 705/9 |

OTHER PUBLICATIONS

Kreifelts et al., "ASCW: An Assistant for Cooperative Work", ACM, 1193, pp. 269-278.*

Dawson et al., "Internet Calendaring and Scheduling Core Object Specification (iCalendar)", RFC 2445, Nov. 1998, 149 pgs.

Prosecution History for U.S. Patent No. 6,850,615 filed Jun. 14, 2001; Patel et al.

* cited by examiner

METHOD FOR COORDINATING A SET OF RELATED TASKS AND EVENTS BY REDUCING DUPLICATED EFFORT

TECHNICAL FIELD

Embodiments of the present invention pertain to computer systems, and in particular to functions performed by computer systems that are communicatively linked.

BACKGROUND ART

There are many instances in which a group of people are each assigned a set of tasks, some of which are shared tasks that can be performed by one person on behalf of the whole group. For example, a group of people may all be traveling between the same two places to attend an out-of-town event. Typically, each person will need to make their own airline reservation and hotel reservation. However, each person does not need to make their own car reservation; instead, one person can reserve a car that can be used by other members of the group.

As plans are made and tasks are completed, entering information about those plans into each person's calendar is both a time-consuming and duplicated effort. Conventional software applications such as personal information managers (PIMs) may facilitate managing a calendar, but they do not address these problems.

In summary, there can be much duplication of effort in coordinating the efforts of a group of people such as the group in the example above. As such, an improved method and/or system for managing shared tasks would be advantageous.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "updating," "placing," "verifying," "providing," "displaying," "reading," "writing," "prompting," "causing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
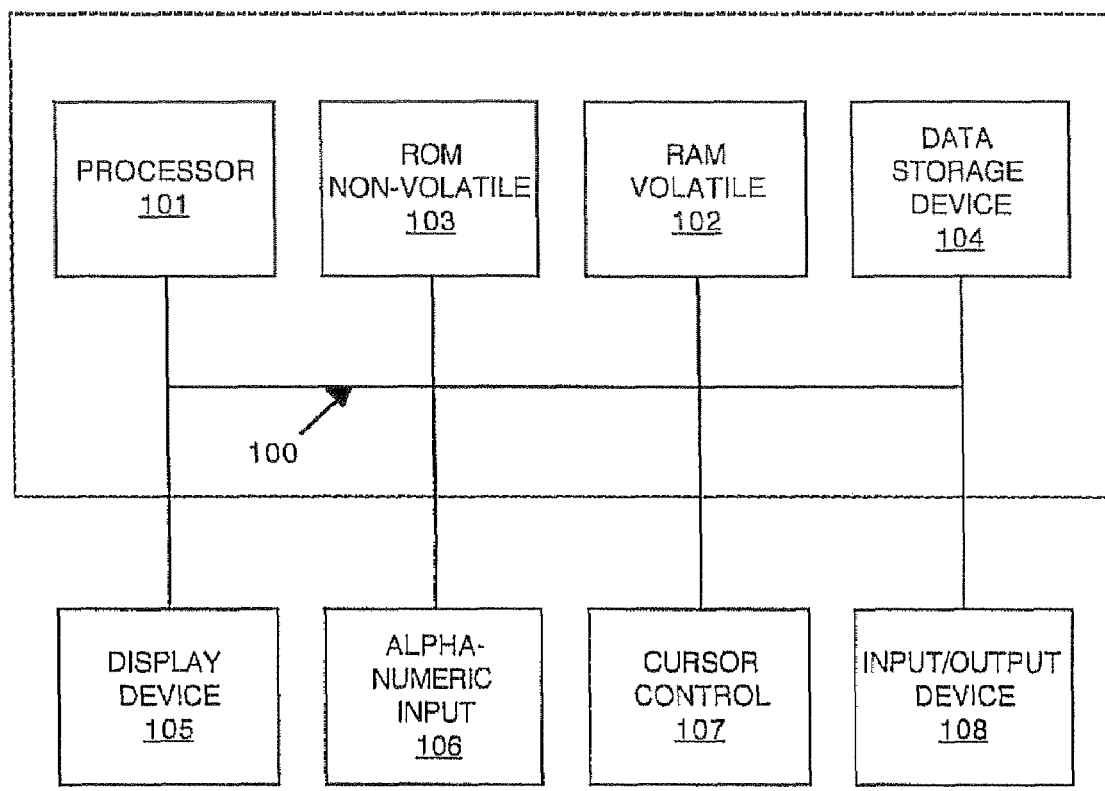
FIG. 1 is a block diagram of an exemplary computer system upon which embodiments of the present invention may be implemented.

Referring first to FIG. 1, a block diagram of an exemplary computer system 112 is shown. It is appreciated that computer system 112 described herein illustrates an exemplary configuration of an operational platform upon which embodiments of the present invention can be implemented. Nevertheless, other computer systems with differing configurations can also be used in place of computer system 112 within the scope of the present invention. That is, computer system 112 can include elements other than those described in conjunction with FIG. 1. Computer system 112 can be, but is not limited to, a desktop, laptop or handheld computer system, a personal digital assistant (PDA), a cell phone, or a pager device.

Computer system 112 includes an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Computer system 112 may also contain an optional display device 105 coupled to bus 100 for displaying information to the computer user. Moreover, computer system 112 also includes a data storage device 104 (e.g., disk drive) for storing information and instructions.

Also included in computer system 112 is an optional alphanumeric input device 106. Device 106 can communicate information and command selections to central processor 101. Computer system 112 also includes an optional cursor control or directing device 107 coupled to bus 100 for communicating user input information and command selections to central processor 101. Computer system 112 also includes signal communication interface (input/output device) 108, which is also coupled to bus 100, and can be a serial port. Communication interface 108 may also include wireless communication mechanisms. Using communication interface 108, computer system 112 can be communicatively coupled to other computer systems over a communication network such as the Internet or an intranet (e.g., a local area network).

Figure 2:
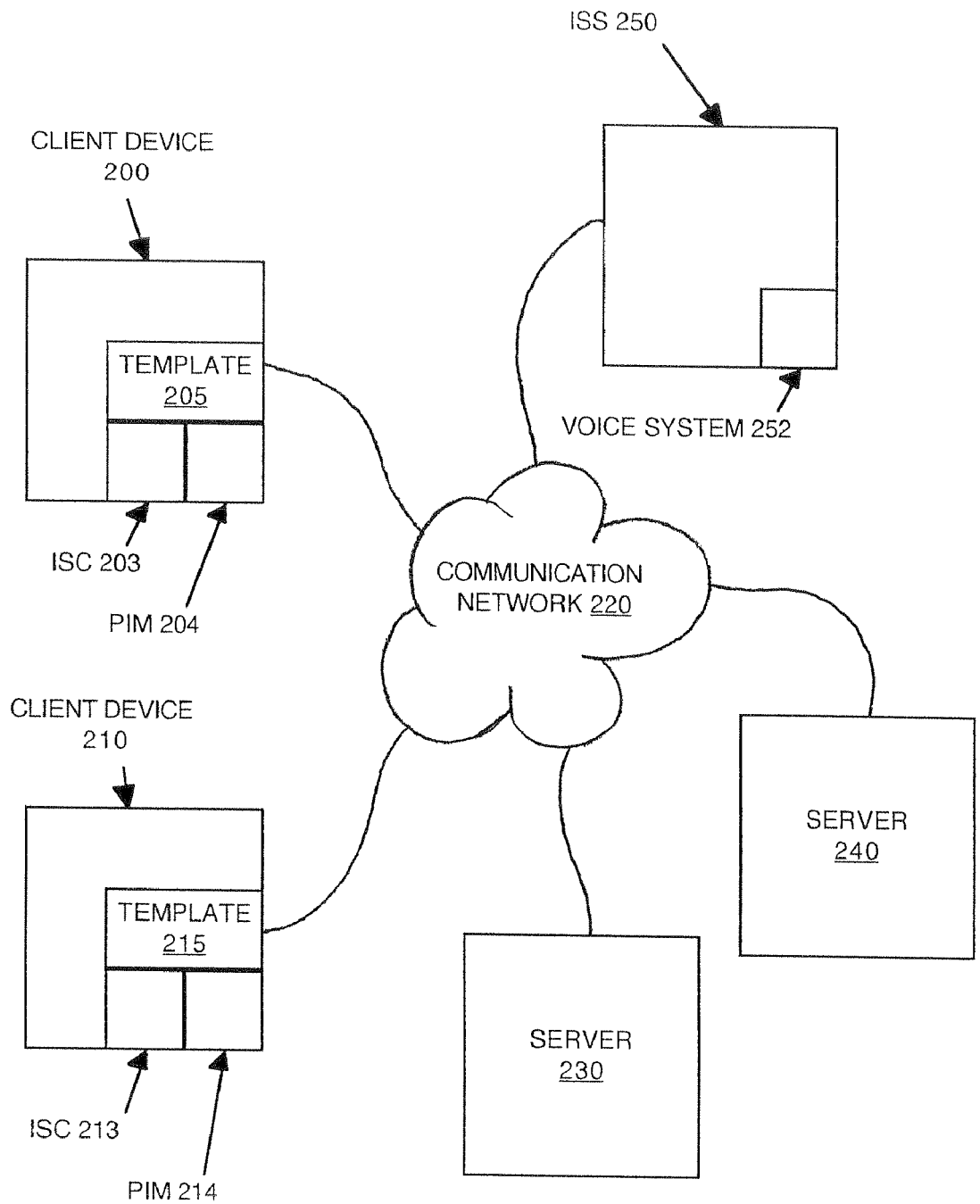
FIG. 2 is a block diagram of an exemplary computer system network upon which embodiments of the present invention may be implemented.

FIG. 2 is a block diagram showing a number of different types of devices in communication with each other and upon which embodiments of the present invention may be implemented. The example of FIG. 2 includes client devices 200 and 210, servers 230 and 240, and a server referred to herein as an intelligent scheduling server (ISS) 250. There may be more of such devices, and there may be types of devices different from those shown. The functionality provided by ISS 250 may be incorporated within the server 230 and/or the server 240. Each of the devices in FIG. 2 can be exemplified as computer system 112 of FIG. 1. Each of the client devices 200 and 210 can be uniquely associated with a respective user.

The devices of FIG. 2 communicate with each other via communication network 220. Communication network 220 represents a collection of wireless and/or wired elements that can include, but are not limited to, a local area network, a wide area network, the Internet, and an intranet.

In one embodiment, the client devices 200 and 210 include intelligent scheduling clients (ISCs) 203 and 213, respectively. In one such embodiment, the client devices 200 and 210 also include personal information managers (PIMs) 204 and 214, respectively. The functionality and features of ISCs 203 and 213 are described further below by way of example. The functionality and features of PIMs are known in the art. In general, PIMs 204 and 214 are software applications that help users organize information. For example, various kinds of text-based notes (e.g., reminders, lists, dates) can be entered and linked using a PIM such as PIMs 204 and 214. PIMs 204 and 214 can also include calendar, scheduling, and calculator programs, for example.

In one embodiment, ISS 250 includes a voice system (e.g., an interactive voice response system) 252. Voice system 252 allows exchanges of information to occur using, for example, a telephone, but without human interaction.

In one embodiment, the templates 205 and 215 include a group of related tasks. For simplicity of discussion, the group of related tasks may be collectively referred to herein as an event. More precisely, there may be an event, with one or more tasks related to the event. The templates of the present invention may be pre-built templates that can be modified (customized) according to the particular event, or new templates can be generated when necessary or desirable.

For each task in a template, there can be one or more common fields that are shared across the templates 205 and 215 and hence shared across users, and there can be one or more individual fields that are specific to a user. The fields specific to a user can be automatically filled in using information retrieved from memory, by a respective PIM or by a respective ISC.

Within the templates 205 and 215, a task can be identified as being a shared task or an individual task. As used herein, a shared task refers to a task that can be performed by one user on behalf of one or more other users, and an individual task refers to a task that is performed individually by each user. Note that multiple users may be assigned the same individual task; for example, each user may have to make an airline reservation. Thus, while it may be said that the users have a common task to perform, that in-common task may not be a shared task.

According to embodiments of the present invention, templates 205 and 215 are used to facilitate the management of related events or tasks, including tasks that are shared by a group of people, in particular shared tasks that can be performed by one person in the group on behalf of some or all of the people in the group. In one embodiment, the ISCs 203 and 213 each send tasks to ISS 250 in the form of the templates 205 and 215, respectively, and ISS 250 communicates the results of performing the task to the requesting ISC 203 and 213. In one embodiment, ISC 203 can also communicate with ISC 213, and vice versa.

The use of templates 205 and 215 to facilitate the management of shared tasks is described further by way of the following examples. In one example, a group of people may all be traveling between the same two places to attend an out-of-town event. Typically, each person will need to make their own airline reservation and hotel reservation. However, each person does not need to make their own car reservation; instead, one person can reserve a car that can be used by the entire group.

According to embodiments of the present invention, either a member of the group or someone else (e.g., an administrative assistant) generates a template for the event, either creating a new template or modifying an existing template. The template will list the various tasks that need to be performed, and will indicate which tasks are shared tasks and which tasks are individual tasks. The template can also identify, for each shared task, a lead individual who has responsibility for performing or completing the shared task.

A template is distributed to each member of the group. More precisely, a template is sent to a respective device (e.g., client device 200 or 210) associated with a member of the group, so that each member has access to the template.

In one embodiment, the template includes fields that are specific to each user, such as, but not limited to, name, phone number and credit card number. As mentioned above, some or all of the fields in the template can then be filled with information extracted from device memory by either a PIM or an ISC.

Also, the ISC can use the information in the template to update each user's PIM. For example, the template may specify the dates over which an out-of-town trip will occur, and those dates can be added to the calendar maintained by the user's PIM.

In addition, the ISC can schedule each task in the user's PIM. That is, for example, the template may include a list of tasks with associated due dates, and these tasks and due dates can be added to the calendar maintained by the user's PIM.

As a template is updated (e.g., with user information, or with task updates as described below), it can be updated at the devices of other users as well. That is, for example, as information is entered into template 205 on client device 200, template 215 can be updated on client device 210. Of course, confidential information, or information that is designated as not to be shared, can be prevented from being included in a template at another device. That is, for example, if a credit card number is entered into template 205, that credit card number can remain private to client device 205, and is not shared with the other client devices. If, however, non-private information is entered into template 205, that information can be updated in the templates residing on the devices belonging to the other group members.

As mentioned above, the list of tasks contained in the template may include a shared task, such as renting a car. Once the shared task has been completed, the template is updated on all of the group's devices to show that this task has been performed. The template can also be updated to show additional information related to the completed task. For example, for a car rental task, the template can be updated to show details associated with the rental.

Also, once an individual task is completed, the template can be updated on all of the group's devices. In an environment where multiple people are performing tasks, information showing each person's progress on the tasks can be valuable. Also, as mentioned above, the template can be updated to provide details associated with the completed task. If, for example, one person has already sought out and booked an acceptable airline reservation, the particulars of the reservation can be shared with the other members of the group.

In some instances, the updating of templates can be driven by the ISC of the user that completed the shared task. In other instances, the updating of templates can be driven by ISS 250. If, for example, a user completes a particular task and indicates such in the template, then the ISC associated with that user can drive the update. If, one the other hand, the task is completed by or through ISS 250 (as described in the examples below), then ISS 250 can drive the update.

When a task—either a shared task or an individual task—is shown in a template as being completed, the user's PIM can be updated as well. For example, an individual task that is listed in the template may have also been scheduled into a user's PIM (e.g., call person A at 4:00). Once the user has completed that task and updated the template to reflect that, the user's PIM can also be updated, removing that task from the PIM. In a similar manner, the user can instead update the PIM to show that the task is completed, and the PIM in turn can update the template, which in turn causes the templates at other devices to be updated.

In one embodiment, the ISC of the present invention is integrated with a voice-capable system such as voice system 252 of ISS 250. Alternatively, the voice-capable system may reside on the client device. Also, the voice-capable system may have text-to-speed (TTS) capability. Using a voice-capable system, some tasks listed in the template can be performed using some combination of pre-recorded speech and TTS. For example, ISC 203 on client device 200 can initiate a phone call to a hotel to make a reservation. An introductory portion of a message to the hotel can be pre-recorded (e.g., "I would like to make a reservation and my name is . . . "). TTS can then be used to read the user's name from the appropriate field in the template and to convert the name into speech. If a need arises for human intervention, then ISC 203 can prompt the client device 200 to alert the user.

The example of the preceding paragraph can be extended to Web-based applications as well. For example, ISC 203 can contact a hotel Web site on server 230 to make a reservation. Information in template 205 can be transferred to the appropriate fields in the hotel's Web page in order to place the reservation. The template may even contain fields indicating user preferences (e.g., for a non-smoking room) that can be transferred from the template to the Web page.

Some tasks may have external dependencies. For example, a task to make a dinner reservation may be set up in template 205. Completing such a task typically will require that the restaurant be contacted during it business hours (that is, while it is open). In one embodiment, an ISC (e.g., ISC 203) can prompt a search of available information sources to identify the restaurant's business hours. For example, by browsing the Internet, a Web page for the restaurant may be located, the Web page can be crawled to determine when the restaurant is open, and this information can be loaded into the template 205 or otherwise provided to the user.

Information accessed and retrieved as described in the example above can also be used to verify the feasibility of a scheduled task. For example, a task to make a dinner reservation may be set up in template 205 to occur at a particular time. Using information about the restaurant's business hours obtained in the manner described above, a user can be warned that the restaurant is not open at that time.

In yet another example, real time information can be used to set up a conditional task. For example, a task to call an airline reservation center may be set up in template 205. An ICS ISC initiates the call without human intervention and monitors the call until an agent or operator at the reservation center is on the line. At that point, the user can be alerted to participate in the call.

The above example can be extended to a situation in which an automatic call distribution (ACD) system is monitored before a call is initiated. By monitoring the status of the ACD system, information such as the average wait time for connection to an agent can be obtained and provided to the user. Based on such information, the user may decide to initiate the call right away or wait until a later time. In one embodiment, the user can establish in a template a threshold or condition that, if satisfied, causes the user to be alerted. For example, the user can specify an acceptable wait time; if the monitored ACD system information falls to less than that time, the user can be alerted. Further information about ACD monitoring is provided by U.S. Pat. No. 6,850,615, assigned to the assignee of the present invention, and hereby incorporated by reference in its entirety.

In the examples above, an event is described as having a number of tasks that are coordinated among different users. Embodiments in accordance with the present invention can also be used to coordinate between events. For example, a task associated with one event can be coordinated with a task associated with another event.

Furthermore, tasks or events for an individual user can be coordinated. For example, a number of people may apply for admission to a college. Each applicant will typically have to complete a number of tasks as part of the admission process. According to embodiments of the present invention, each applicant can be issued a template that lists those tasks and is integrated with an applicant's PIM, in a manner similar to that described above.

Figure 3:
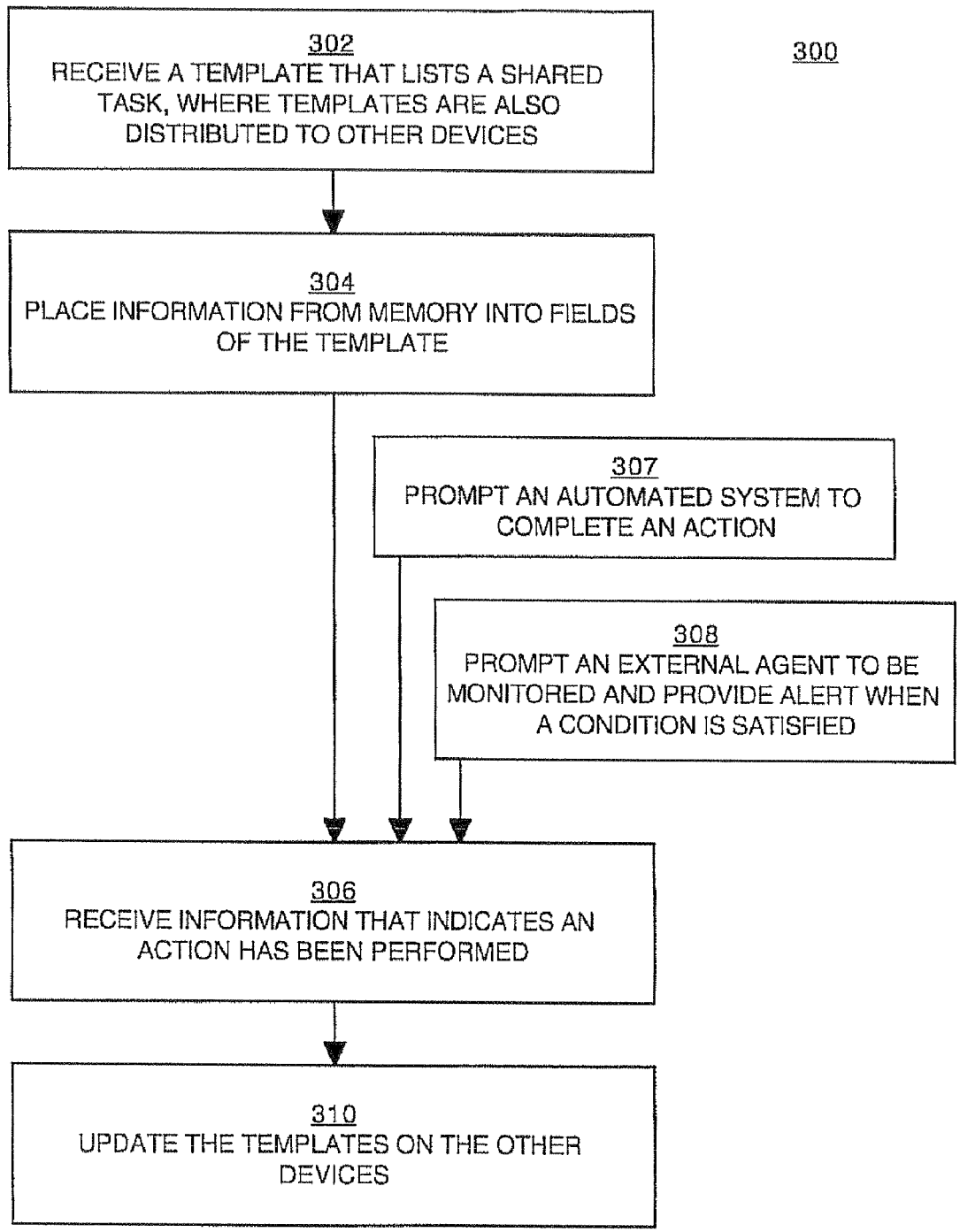
FIG. 3 is a flowchart of a method for managing shared tasks according to one embodiment of the present invention.

FIG. 3 is a flowchart 300 of a method for managing shared tasks according to one embodiment of the present invention. Although specific steps are disclosed in flowchart 300, such steps are exemplary. That is, embodiments of the present invention are well suited to performing various other (additional) steps or variations of the steps recited in flowchart 300. It is appreciated that the steps in flowchart 300 may be performed in an order different than presented, and that not all of the steps in flowchart 300 may be performed. In one embodiment, flowchart 300 is implemented as computer-readable program code stored in a memory unit of computer system 112 and executed by processor 101 (FIG. 1).

In block 302 of FIG. 3, with reference also to FIG. 2, a first device (e.g., client device 200) receives a template (e.g., template 205) that includes a listing of one or more tasks. The tasks are common to a group of individuals. The listing can include one or more shared tasks. A shared task includes an action that, when completed by one of the individuals in the group, is completed for all of the individuals in the group. The listing can also include one or more tasks that are performed by each of the individuals. The template is distributed in parallel to a group of devices associated with the individuals in the group.

In block 304 of FIG. 3, information that is read from a memory of the first device is placed into fields of the template.

In block 306, information identifying that the action (e.g., the shared task) has been performed is received at the first device.

In block 307, in one embodiment, the action is performed using an automated system.

In block 308, in one embodiment, the action is subject to a condition. In one such embodiment, the condition is verified as to whether or not it is feasible. In another embodiment, information that identifies a constraint associated with the condition is retrieved and added to the template. In another such embodiment, an alert is provided when a condition applied to an external agent associated with performing the action is satisfied.

In block 310, the template is updated at the first device and also at the group of devices to indicate the action has been performed.

In summary, embodiments in accordance with the present invention provide methods and systems for coordinating a set of related tasks and/or events using a template that can be understood by and integrated with, for example, a PIM. In various embodiments, schedules can be arranged according to external dependencies, fields in the template can be filled in using information read from memory, and tasks can be performed by voice-capable systems. As tasks are completed, templates and PIMs can be automatically updated, so that completed tasks (in particular, completed shared tasks) are visible to all group members. Consequently, the amount of duplicated effort is reduced.

Embodiments of the present invention are thus described. While the present invention has been described in particular embodiments, it should be appreciated that the present invention should not be construed as limited by such embodiments, but rather construed according to the below claims.

What is claimed is:

1. A method comprising:
   designating a task associated with a respective action that is completed once for a plurality of individuals as being a shared task, where being said shared task is designated on a computer-generated template comprising a task list, and where said computer-generated template is configured so that each of said plurality of individuals is authorized to complete said shared task on behalf of all of said plurality of individuals;
   designating a task associated with a respective action that is completed separately by one individual of said plurality of individuals as being an individual task, where being said individual task is designated on said computer-generated template, and where said computer-generated template is configured so that said one individual is authorized to complete said individual task specific to said one individual;
   subsequent to completing said respective actions of said designated tasks, distributing a result of said designated tasks in parallel to a plurality of devices associated with said plurality of individuals; and
   updating said task list in parallel on said computer-generated template at each of said plurality of devices according to said distributed result to indicate that one or more of said designated tasks have been completed, where said respective action of said individual task is not viewable by others of said plurality of individuals.

2. The method of claim 1 where said respective action of said designated task is completed using an automated system for determining an availability of an external agent associated with performing said designated task, said automated system external to said plurality of devices.

3. The method of claim 2 where said automated system has voice capability and is configured to automatically communicate with said external agent.

4. The method of claim 2 where said automated system is configured to browse a web page to determine information associated with said designated task.

5. The method of claim 4 where said designated task comprises making a reservation.

6. The method of claim 1 where said individual task is separately completed by each of said plurality of individuals, and where said shared task is completed the same for all of said plurality of individuals.

7. The method of claim 1 where said individual task is common to and viewable by more than one of said plurality of individuals, and is not designated as being a shared task, and where said respective action of said individual task is independently completed by each of said plurality of individuals.

8. A computer-readable medium having a set of instructions stored therein which when executed by a processing device causes the processing device to perform procedures comprising:
   designating a task as being a shared task, where being said shared task is designated on a computer-generated template comprising a task list, where said shared task is completed in common for a plurality of users, where said computer-generated task list is configured so that each of said plurality of users are authorized to complete said shared task, and where said shared task comprises an action that when completed by one of said plurality of users is completed for all of said plurality of users;
   designating a task comprising a respective action that is separately completed by one or more users as an individual task, where said individual task is further designated as confidential;
   distributing a result of said designated tasks to a plurality of devices associated with said plurality of users; and
   updating said task list on said computer-generated template in parallel at said plurality of devices to indicate that one or more of said designated tasks have been completed, where said respective action of said individual task is not viewable by others of said plurality of users.

9. The method of claim 1 where said designated task is updated at said plurality of devices, indicating that said respective action is completed for all of said plurality of users, once said respective action is completed by one of said plurality of users.

10. The computer-readable medium of claim 8 where the procedures further comprise prompting an automated system associated with said plurality of devices to perform said action.

11. The computer-readable medium of claim 10 wherein said automated system has voice recognition capability, and where said action comprises:
    contacting a third party; and
    determining an expected wait time before being connected to an operator of said third party.

12. The computer-readable medium of claim 10 where the procedures further comprise automatically transferring information associated with one or more of said plurality of users to an external agent, where said action comprises making a reservation.

13. The computer-readable medium of claim 10 where said automated system is configured to:
    crawl a web page identified by said shared task; and
    automatically transfer information associated with one or more of said plurality of users to said web page.

14. The computer-readable medium of claim 8 where said procedures further comprise:
    designating a task that is completed separately by one individual of said plurality of users as being said individual task, where said one individual is authorized to complete said individual task specific to said one individual, and where said individual task is independently completed by each of said plurality of users.

15. A computer system for managing shared tasks, said computer system comprising:
- means for designating a task comprising a respective action that is separately completed by one or more individuals as being an individual task, where being said individual task is designated on a computer-generated task list;
- means for designating a task comprising a respective action that when completed by one of said individuals is completed for all of said individuals as being a shared task, where each of said individuals are authorized to complete said shared task, and where being said shared task is designated on said computer-generated task list;
- means for distributing said computer-generated task list comprising a plurality of designated tasks in parallel to a plurality of devices associated with said individuals;
- means for identifying that said respective actions of said designated tasks have been performed;
- means for updating said computer-generated task list in parallel at said plurality of devices to indicate that one or more of said designated tasks are completed; and
- a display device for displaying said computer-generated task list, where said respective action is determined to be completed for said individuals according to the designation of said designated task as being individual or shared, and where said respective action of said individual task is not viewable by others of said plurality of individuals.

16. The computer system of claim 15 where said respective action of said individual task is performed differently by a plurality of said individuals, and where said respective action of said shared task is performed the same for said plurality of individuals.

17. A system comprising:
- a computer system enabled to execute a template generator that generates a list of one or more tasks, where each of said one or more tasks is designated on said list as being either an individual task or a shared task, where said individual task comprises a respective action that is separately performed by one or more of a plurality of individuals, where said individual task is common to and viewable by more than one of said plurality of individuals and is not designated as shared, where said shared task is common to said plurality of individuals and comprises a respective action that when performed by any one of said plurality of individuals is designated on said list as being performed on behalf of all of said plurality of individuals, where said shared task is completed the same for all of said plurality of individuals, where each of said plurality of individuals are authorized to complete said shared task, and where said list is distributed in parallel to a plurality of devices associated with said plurality of individuals; and
- an intelligent scheduler that receives information identifying that said respective actions of said one or more designated tasks have been performed by one or more of said plurality of individuals, and updates said list at said plurality of devices in parallel to indicate one or more of said designated tasks have been completed, wherein said respective action of said individual task completed by one of said plurality of individuals is not viewable by others of said plurality of individuals.

18. The system of claim 17 wherein said designated task is designated as individual, where said individual task is independently completed by each of said plurality of individuals, and where said intelligent scheduler tracks a separate progress of each of said plurality of individuals in completing said individual task.

19. The system of claim 18 where said individual task is completed differently by more than one of said plurality of individuals.

20. The system of claim 17 where said intelligent scheduler provides an alert when a condition applied to an external agent associated with performing said respective action of said designated task is satisfied.

* * * * *

UNITED STATES PATENT AND TRADEMARK OFFICE
CERTIFICATE OF CORRECTION

PATENT NO. : 7,716,671 B2
APPLICATION NO. : 11/177519
DATED : May 10, 2011
INVENTOR(S) : Johnny Lee It is certified that error appears in the above-identified patent and that said Letters Patent is hereby corrected as shown below:

On the title page item: (54), TITLE, delete "METHOD" and insert -- SYSTEM AND METHOD --.

On column 1, Title, delete "METHOD" and insert -- SYSTEM AND METHOD --.

Signed and Sealed this
Seventeenth Day of April, 2012

David J. Kappos
*Director of the United States Patent and Trademark Office*

UNITED STATES PATENT AND TRADEMARK OFFICE
CERTIFICATE OF CORRECTION

PATENT NO. : 7,716,671 B2  
APPLICATION NO. : 11/177519  
DATED : May 11, 2010  
INVENTOR(S) : Johnny Lee et al.

Page 1 of 1

It is certified that error appears in the above-identified patent and that said Letters Patent is hereby corrected as shown below:

On column 9, line 28, CLAIM 15: after "said" delete "plurality of".

Signed and Sealed this
Twenty-eighth Day of August, 2012

David J. Kappos
*Director of the United States Patent and Trademark Office*